United States Patent [19]

Haskins

[11] 4,436,964
[45] Mar. 13, 1984

[54] HOOKSWITCH MECHANISM FOR TELEPHONE INSTRUMENT

[75] Inventor: Steve W. Haskins, Corinth, Miss.

[73] Assignee: International Telephone and Telegraph Corporation, New York, N.Y.

[21] Appl. No.: 302,179

[22] Filed: Sep. 14, 1981

[51] Int. Cl.³ .................. H01H 21/06; H01H 21/24; H01H 21/82; H04M 1/08
[52] U.S. Cl. .................... 179/164; 200/6 BB; 200/303
[58] Field of Search ............ 179/164, 159, 100 D, 179/100 C, 100 R; 200/6 BB, 6 B, 6 C, DIG. 46, 283, 303

[56] References Cited

U.S. PATENT DOCUMENTS

| 2,068,713 | 1/1937 | Schellenger | 200/154 |
| 2,262,306 | 11/1941 | Thompson | 200/6 BB |
| 2,566,840 | 9/1951 | Krumreich | 179/100 D |
| 3,637,953 | 1/1972 | Rüster et al. | 179/164 |
| 4,346,269 | 8/1982 | Slavin et al. | 200/11 DA |

FOREIGN PATENT DOCUMENTS 191893  1/1923  United Kingdom ............ 200/6 BB

OTHER PUBLICATIONS

"Standard Telephone Set, Diavox 100", by Branden et al., *Ericsson Review*, vol. 57, No. 2, 1980, pp. 38–45.

Primary Examiner—Thomas W. Brown
Attorney, Agent, or Firm—John T. O'Halloran; Alfred C. Hill

[57] ABSTRACT

A pivotal hookswitch mechanism which includes a transverse camshaft supported between an actuating arm of a cradle lever. The camshaft carries a plurality of transversely spaced contact spring operating cams, each cam positioned between respective contact springs of a spring pair. The camshaft is carried with its transverse ends within bearing openings of an enclosing housing, the housing enclosing the cams and contact springs. The contact springs are leaf springs resting in two parallel arrays of slots in the housing, the springs being identical. The housing is constructed of two identical shell members each forming a half of the housing, with one half being inverted relative to the other to form the central cavity for the operating components of the mechanism. The housing provides a dust-tight enclosure for the contact springs and cams with entry openings into the housing cavity filled, the enclosure structure serving as a pivot axis and pintle for the actuating lever.

9 Claims, 10 Drawing Figures

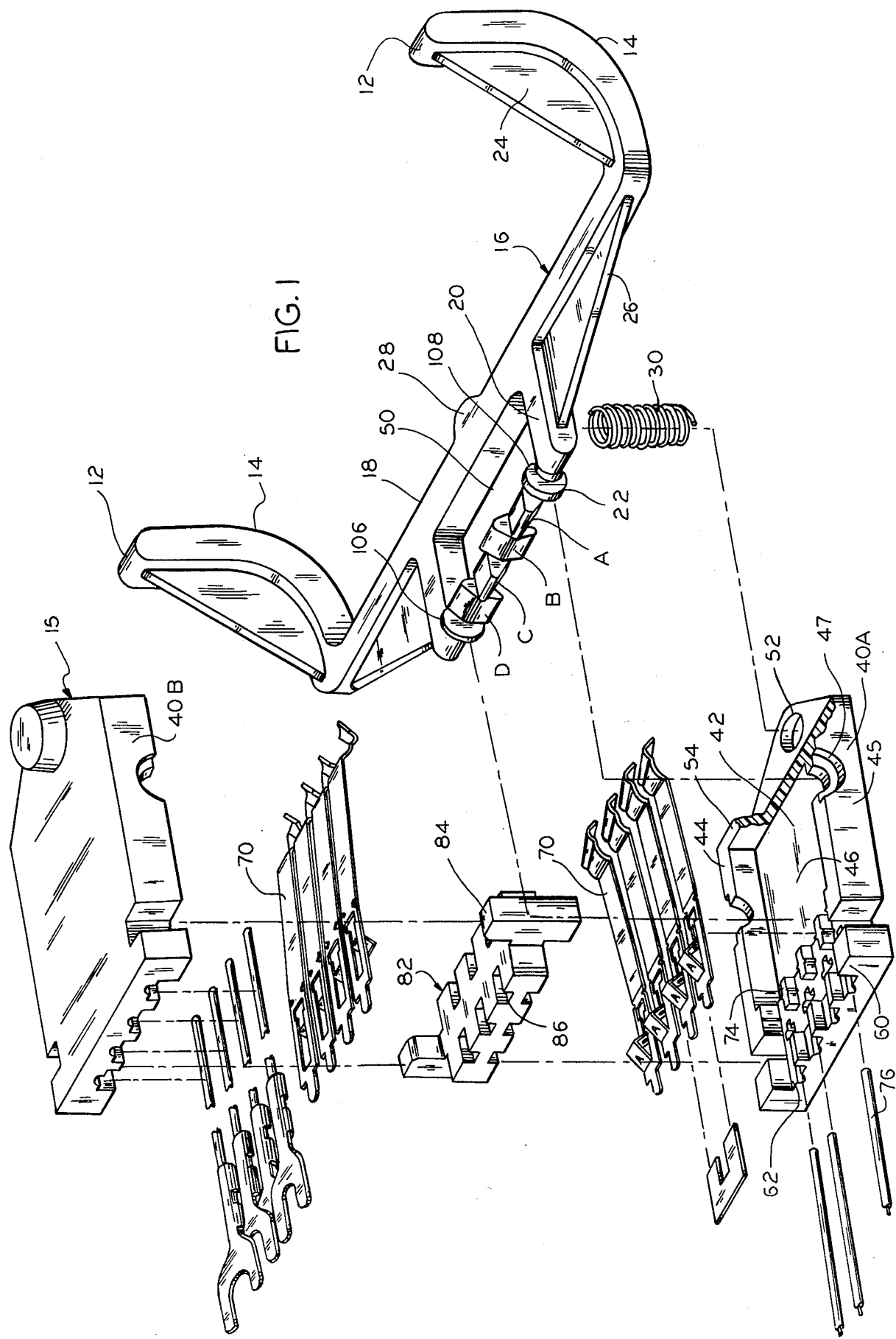

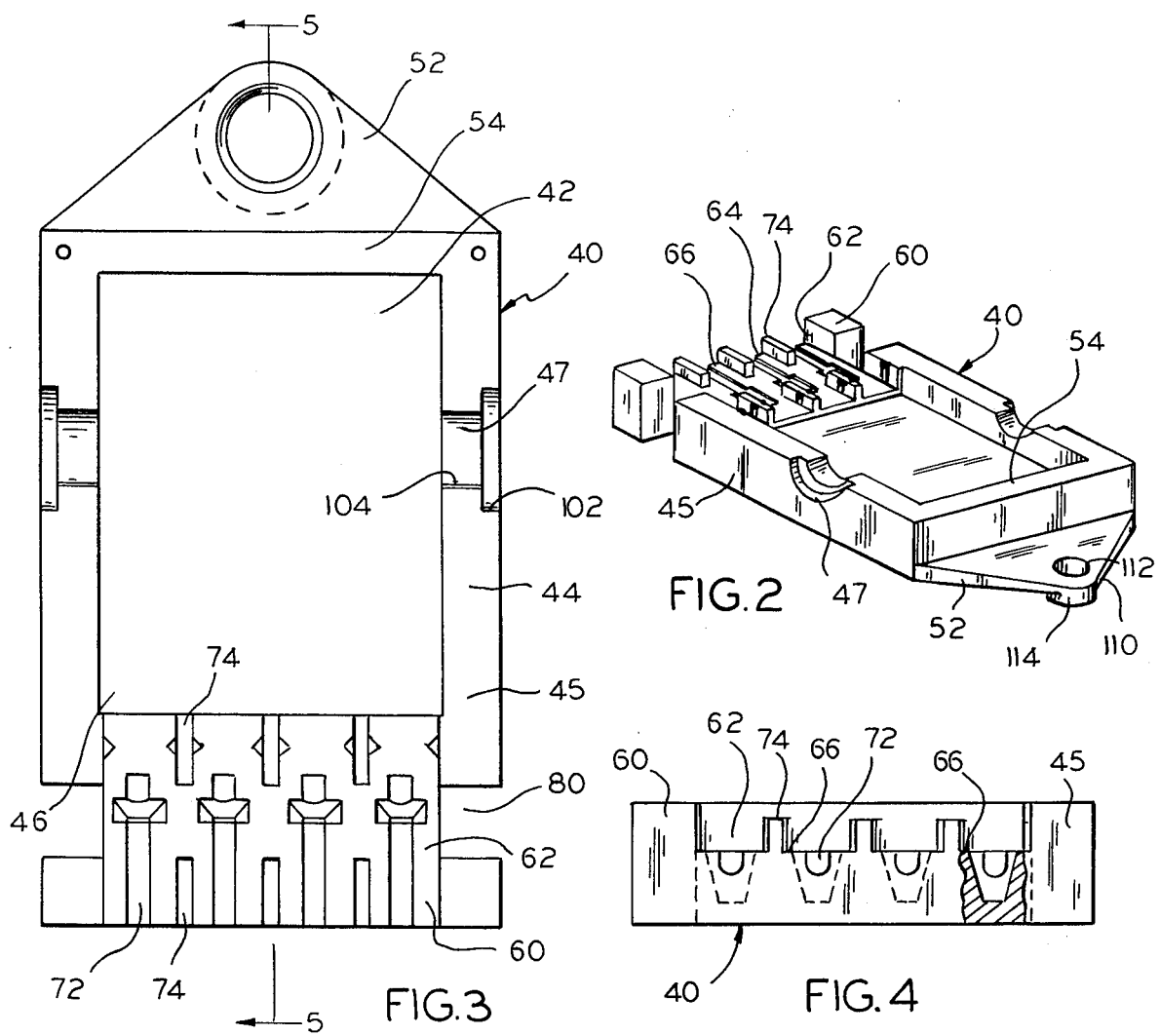

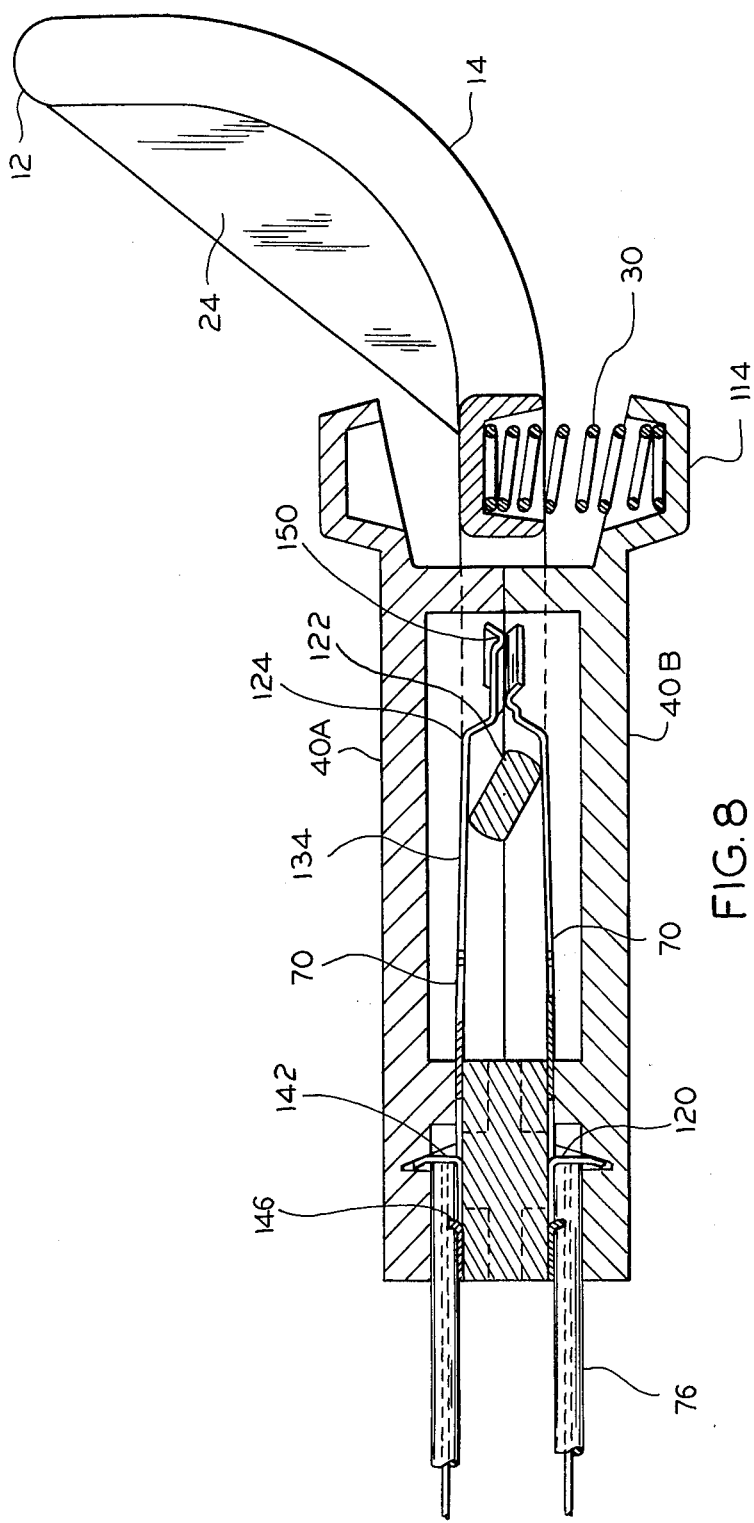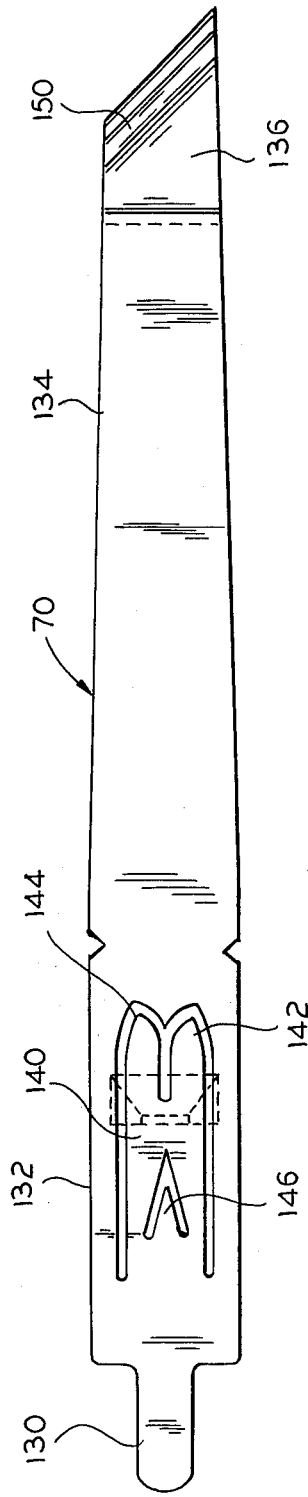

4,436,964

HOOKSWITCH MECHANISM FOR TELEPHONE INSTRUMENT

RELATED APPLICATIONS

The present application is a companion application to U.S. patent applications Ser. Nos. 301,462 and 301,832, filed by me on the same date as the present application.

BACKGROUND OF THE INVENTION

Switch mechanisms for operating a plurality of switch contacts are of course well-known. Many use a single switch operator to progressively act on contact pairs to make or break contacts. Others use plunger mechanisms to actuate the contacts. Another form of switch uses cams on a rotating member to operate a plurality of contact sets, as shown in U.S. Pat. No. 3,637,953 issued Jan. 25, 1952 to H. Ruster et al. In that patent, a section of a cylinder is rotated about its axis to move shaped cams mounted on the cylinder to actuate contacts. The cylinder section provides a partial enclosure for the contacting members.

SUMMARY OF THE INVENTION

The present invention is directed to a switch mechanism usable as the cradle or hookswitch mechanism of a telephone instrument. The mechanism has actuating arms joined by a transverse shaft which bears a plurality of transversely spaced contact operating cams. Each cam rests between opposed leaf springs. The springs in turn have formed contact sections spaced longitudinally from the cams to make and break relative to the respective sections of the individual opposed contact spring in a fixed sequence. The leaf springs are identical in configuration.

The camshaft, cams and springs are enclosed within a split housing formed of two identical halves. In the finished assembly, the housing halves may be suitably bonded or adhered to form a unitary dust-tight housing which can be replaced if necessary.

The housing halves are identical, one being inverted relative to the other to form the central cavity in which the contact springs are spaced apart transversely by raised housing projections. Vertically, a block spacer separates the alignments of contact springs and mates with the raised projections. Thus, the contact springs are held firmly in place within the housing.

The invention provides a hookswitch mechanism which can be produced inexpensively in a unitary structure comprised of a minimum inventory of parts. The invention employs a camshaft which is permanently sequenced to operate the contact springs, the operating mechanism being enclosed in a dust-resistant housing.

The invention further provides an enclosed housing with camshaft throws extending transversely of the housing for pivotal movement under the control of the arms of the acutating lever.

The invention has as a major feature a switch mechanism which can be assembled into a unitary enclosed structure with the structure acting as the pivot axis and pintle of the switch actuating lever.

BRIEF DESCRIPTION OF THE DRAWINGS

FIG. 1 is an exploded perspective view of a first embodiment of a hookswitch mechanism according to the invention;

FIG. 2 is a side view in perspective of a housing shell as used herein;

FIG. 3 is a plan view of the shell of FIG. 2;

FIG. 4 is an end view in elevation of the shell of FIG. 3;

FIG. 5 is a sectional view taken along line 5—5 of FIG. 3;

FIG. 6 is a side view in elevation of a pair of contact springs and their actuating cam as used herein;

FIG. 7 is a sectional view of a typical cam as used herein;

FIG. 8 is sectional view through the center of the mechanism of FIG. 1 in its assembled state;

FIG. 9 is a plan view of a typical leaf spring of FIG. 1; and

DETAILED DESCRIPTION

Figure 10:
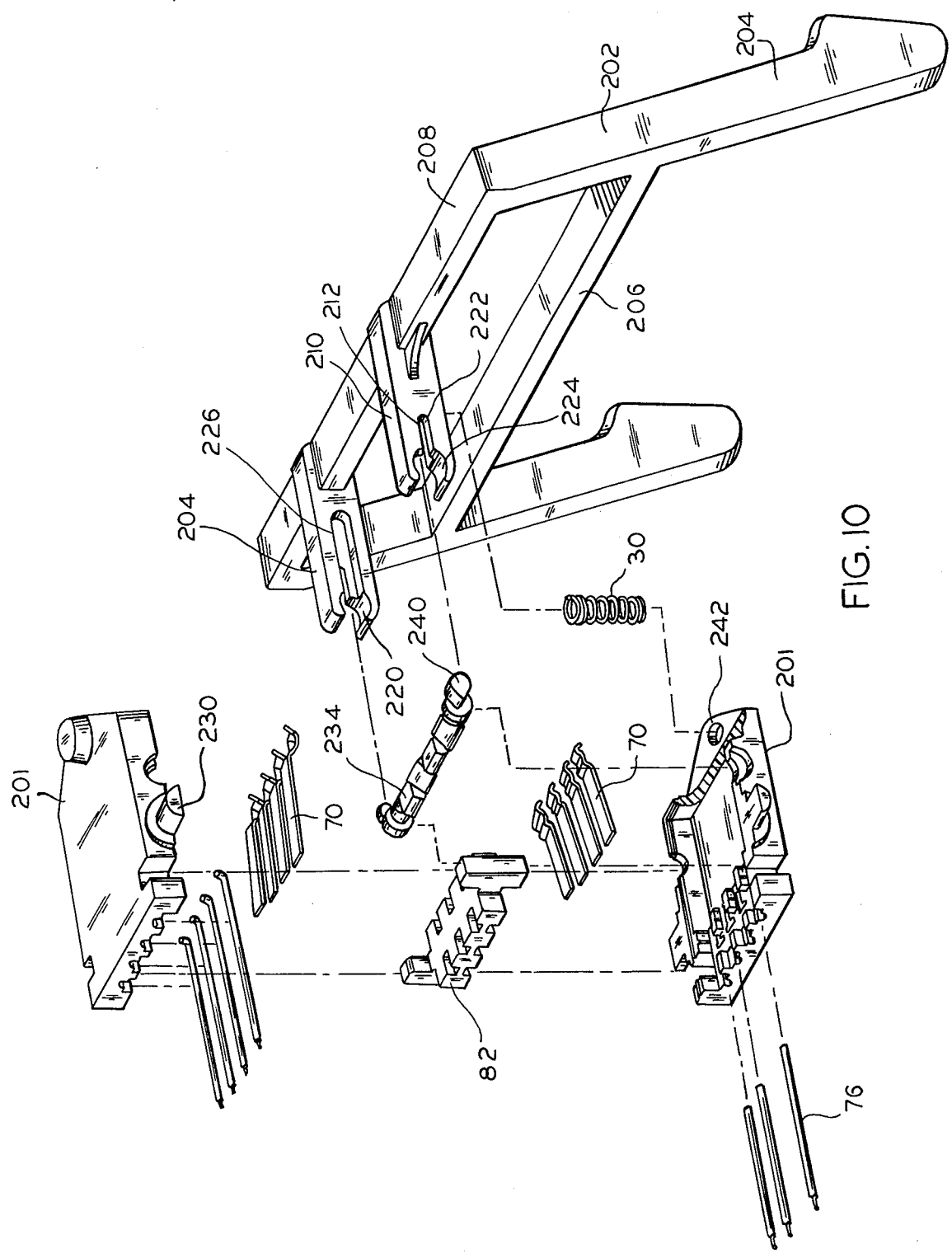
FIG. 10 is an exploded perspective view of a second embodiment of a hookswitch employing my invention.

In FIG. 1, I show a first embodiment of the hookswitch mechanism for use in a telephone instrument. The mechanism includes an actuating lever 16 and a housing assembly 15, the assembly including the contacts operated by the lever 16. The mechanism in one form could be positioned with the tips 12 of the parallel spaced apart actuating arms 14 of lever 16 under the plungers of the well-known 500 type telephone. The parallel actuating arms 14 form the lateral extremities of the actuating lever 16. The arms 14 are curved from the tips 12 to their connection to the cross brace 18. Extending longitudinally from the cross brace 18 are two support arms 20 for the camshaft 22.

Within the actuating lever 16, there are provided suitable reinforcing webs 24 and 26 extending between members in respective planes. In addition, the cross brace 18 has a central semicircular projection 28 which preferably has a blind hole (not shown) in its underside for confining the upper end of compression spring 30.

The actuating lever 16 may be molded as a unit and the camshaft may either be molded as a part of that unit or may be mounted on a shaft fitted into suitable openings (not shown) in support arms 20.

The housing assembly 15 shown in exploded form in FIG. 1 includes a pair of base sections or shells 40A and 40B, each of which forms half of an enclosing housing for the spring array. A base section may be molded of suitable thermoplastic material with the two identical base sections designated 40A and 40B respectively joined together, one inverted relative to the other to form the enclosing housing assembly 15 for receiving and enclosing the spring array. Each base section 40A and 40B has a generally rectangular internal cavity surface 42 with walls 44 upstanding about the periphery of the surface to form a central cavity 46 within the walls 44. To provide a perspective as to the relative size of the mechanism, the housing for one commercial application would be $\frac{3}{4}''$ transverse width, $1\frac{1}{4}''$ in length and $\frac{1}{2}''$ in thickness.

Base sections 40A and 40B have semi-circular aligned bearing openings 47 in their transverse sidewalls 45 adapted to receive the camshaft 22 in a completed assembly. With the camshaft resting in the openings 47, the sidewalls 45 are within the space between the support arms 20. Each base section is generally rectangular, with a triangular extension 52 of the main surface 42 at the forward end externally of the front wall 54. As assembled with the lever 16, the extension 52 is spaced a distance from the projection 28 to capture therebetween compression spring 30.

The rear wall 60 of the base sections 40A and 40B are provided with a series of spaced channel indentations 62, the number of indentations being equal to the number of spring combinations used. Each channel indentation has an essentially horizontal main surface 64 (see FIG. 2), the surfaces combinedly forming a plane 66 for resting thereon respective leaf springs 70. Each indentation 62 has centered thereunder (viewing the lower base) a central semicircular longitudinal cutout 72 (see FIGS. 3 and 4) for receiving a wire for connection to a leaf spring 70 resting on its surface 64 of the indentation.

Between the indentations 62 of the base sections 40A and 40B, the rear wall has upright discontinuous rib members 74 (see FIGS. 1-5) adapted to position leaf springs in the plane 66. The cutouts 72 serve to hold and align individual insulated wires 76 adjacent the respective leaf springs 70.

On the transverse sides of the base outwardly of the spring mounting area adjacent the rear thereof, both sidewalls 45 have a vertical slot 80 (see FIG. 3) extending fully through the base. The two slots 80 are adapted and sized to receive mounting pillars 84 of a clamping insert 82 (see FIG. 1) in a tight fitting relation. The insert 82 is used to firmly mount the springs 70 relative to the plane 66 within the housing. The insert has longitudinal slots adapted to mate with rib members 74 to further lock the insert 82 firmly to the base sections 40A and 40B.

Viewing FIG. 1, the housing 15 includes a lower base section 40B and an upper base section 40A, base section 40A being inverted relative to base section 40B. Insert 82 fits between these base sections and is assembled onto the lower base section 40B. The upper base section 40A is then mated with the insert by fitting pillars 84 into slots 80. As mentioned, insert 82 has a spring mounting section and at its transverse sides have vertical pillars 84 for mating with the slots 80 to secure the insert in the base sections to hold the leaf spring contacts in place between both base sections 40A and 40B. The insert 82 has longitudinal recesses 86 in both its upper and lower surfaces which mate with the base section spacing members 74 to rigidly hold the insert in place in all directions and to secure the upper and lower base sections together with the leaf springs captive between the insert and the respective base sections.

In the structure of FIG. 1, the actuator lever 16 is moved by a switch operator or by plungers (not shown) to rotate the actuator lever 16 with or on the axis of the camshaft. On the camshaft, there are a plurality of laterally spaced cams, each such cam positioned between vertically spaced (as in FIG. 1) leaf springs. Rotation of the camshaft rotates the cams with their highs and lows to either make or break the leaf spring contacts in a desired sequence, as indicated by the cam settings and lobe positioning.

FIGS. 2-5 show a typical base section 40A and 40B in greater detail. In these figures, the general rectangular shape of the base section is apparent with its walls 44 forming a raised periphery for the central cavity. The aligned bearing openings 47 formed in the sidewalls 45 are configured of an enlarged diameter external portion 102 and a smaller diameter inner portion 104 both concentric with the bearing opening. The camshaft 22 is configured to mate with the opening 47 (See FIG. 1) with an outer enlarged diameter portion 106 rotating within portion 102 to shield and effectively seal the inner, lesser diameter bearing 108. Bearing 108 mates with portion 104 to combinedly provide a bearing area within a dust seal which seals the housing cavity from dust and other contaminants.

As seen best in FIGS. 2 and 3, the triangular extension 52 of the housing main surface 42 has a tapering cross section narrowing in thickness in the direction of the apex 110 of the extension 28. The extension 28 has a blind bore 112 closed at its outer end within a circular boss 114 seen best in FIGS. 2, 3 and 5. The blind bore 112 provides a bearing surface for one end of compression spring 30 to restore and maintain the hookswitch in its normal unactuated condition.

At its rear, the housing has channel indentations 62 separated by spacer rib members 74, each channel indentation having a semi-circular longitudinal cutout 72 incised in it. Each cutout 72 has midway along its longitudinal extent a tapering vertical (FIGS. 4 and 5) socket 120 for receiving a portion of the spring contact to engage and hold an insulated wire in contact with the contact spring, as will be explained.

In FIG. 6, I show a typical cam 122 of camshaft 22 resting between opposed contact springs in its unoperated or closed state, the cam 122 beung shown alone in FIG. 7. In FIG. 6, I also show in dashed line form aligned with cam 22, a second cam 126 shown in a position having operated its contacts to an open condition. Each cam has two curved lobes which are asymmetrically disposed to introduce over travel for wiping action to clear the contacts of possible contaminants. The cams may be molded as part of a one-piece camshaft preferably of a material such as reinforced nylon or a suitable polyester. The angular position of the cams may be staggered to provide a desired sequence of operations.

The leaf spring contacts 70 are shown in detail in FIGS. 1, 6, 8 and 9. The springs 70 are all identical, there being shown eight springs aligned in four pairs within an assembled mechanism. The spring pairs are spaced transversely as shown in FIG. 1 with each pair having a cam positioned between the springs of the pair to control the operation of the pair on rotation of the cam. Each spring extends from a tang end 130 through a wire connection portion 132 and a cam engaging portion 134 to the contact end 136.

The tank end 130 in the completed assembly extends past the rear wall 60 of the housing to enable plug-in mounting of the housing assembly into a circuit board or other suitable receiving terminal structure (not shown) as an alternative to the connection of conductor wires to the contact springs, as shown. The tang end 130 has reduced transverse width to enable this plug-in capability.

The wire connection portion 132 includes a pierced portion formed with a central raised knee 140 angled from the spring body with a descending bifurcated tip 142 at the free end of the pierced material. The bifurcation of tip 142 produces a pair of transversely spaced prongs 144 extending beneath the body or main portion 134 of the spring. A triangular pierced depression 146 is fabricated into the rising wall of the knee for a purpose which will be explained hereinbelow. Portion 134 is a flat intermediate portion of the leaf spring which rests in the central cavity of the housing, when assembled (See FIG. 8).

The contact end of the spring includes a raised or stepped contacting ridge surface 150. The formed surface is raised from a step 152 at the forward end of the spring, the step 152 being raised from the body portion 134 of the spring. The actual contacting element may be staked or inlaid contact as is well-known or may be a raised angled ridge 150 suitably plated (as shown). This surface 150 may be suitably plated with contact metal.

The clamping insert 82 is shown in FIGS. 1 and 10 and has a main transverse body with vertical pillars 84 centered at the transverse sides thereof. The pillars are rectangular in cross-section and extend above and blow the main body 88. The body has plural parallel slots or recesses 86 in its top and bottom surfaces extending partially longitudinally, there being slots 86 in both the front and rear and in the top and bottom of the body. The insert is symmetrical so that it mates with both the upper base section 40A and lower base section 40B and its forward and rear ends are identical so that it may be assembled without regard to specific positioning as forward or rear, up or down. The slots 86 in the insert body 88 are adapted to mate with the rib members 74 of the base sections 40A and 40B to readily position and align the insert relative to the base sections 40A and 40B.

The embodiment of FIG. 10 is generally similar to that previously described with changes in the shape of the actuator lever, the camshaft and the addition of pivot stubs 230 on the housing 201 for providing the pivot shaft for the actuator lever.

The actuator lever 202 of FIG. 10 is a one piece molded plastic member with parallel spaced apart arms 204 and transverse cross bracing members 206 and 208. The actuator lever has spaced apart housing mounting arms 210, the arms having parallel slots 212 in their ends. The slots are configured with a transverse outer section and an inner section. The outer section has a generally circular terminus 220 open at one end leading at the inner end to a comparatively narrow blind slot 222. The inner section has an outer area 224 coextensive with the circular terminus 220 leading to slot 226 of larger height than slot 222 while extending further into the arm than slot 222.

To mate with the slots, the housing 201 of FIG. 10 has segmental pivot stubs 230. When the base sections are paired to constitute a housing, the segmental stubs are aligned to form a cylindrical shaft which fits within both circular slot sections 220 and 224 of the actuator lever and form a pivot for the actuator relative to the housing.

The camshaft 234 of FIG. 10 has transverse outer eccentric cam throws 240 at each end which are designed to slide into the inner slot ends 226 of the actuator lever. These eccentric cam throws 240 in conjunction with the actuator lever produce for approximately 12° of lever movement as much as 48° of cam rotation in addition to the rotation caused by the angular movement of the actuator lever. In this embodiment the camshaft does not act as the pivot axis for the actuator lever, but instead the stub pivot shaft 230 spaced from the camshaft forms the pivot axis. The spacing of the camshaft from the pivot axis provides a lever arm distance for movement of the camshaft which is further enhanced by the eccentric cam throws riding within the actuator lever slot ends 226. The structure of FIG. 10 enables the joining of the switch housing to the actuator lever by sliding the end cam throws 240 into the lever slot ends 226 until the units are full mated. In this fully mated condition, the end cam throws 240 rest in the inner slot ends 226 while the stub shaft rests in the outer annular ends 224.

It has been noted that the cam lobes need not be aligned with one another, and can be inclined at different angles relative to a vertical line through the cam axis to provide a desired sequencing of the operation of the contact sets. Within the structure of the camshaft of FIG. 10, I have provided a method of ensuring that the camshaft is mated with the actuator lever in only one position. I perform this "keying" by having each end cam throw 240 of a different lateral thickness and by providing different depths of the receiving inner slots 226 of the actuator lever of the left and right arms as viewed in FIG. 1. Thus, the camshaft can only seat properly in the actuator lever in one orientation with the thicker cam throw within the slot of greater depth.

In the showing of FIG. 10, the housing base lower section 201 has a transverse blind indentation 242 in its surface designed to receive spring 30 in much the same manner as blind indentation 52 of FIG. 1.

As can be understood from the embodiment of FIG. 1, the housing and actuator lever are assembled into a unitary assembly. The assembly would be undertaken by placing one base section such as base section 40B of FIG. 1 in a cavity up position on a flat surface. Insulated wires 76 are then laid into the cutouts 72 extending to the end of the cutouts as seen in FIG. 3. Four such wires would be used, one for each indentation 62 and its corresponding cutout 72. Leaf springs 70 are inserted next. Four leaf springs would be placed in the indentations, one spring per indentation with the spring knee facing upwardly and the prongs 144 facing downward. As a spring is inserted, its bifurcated tip 142 is placed within the entrance to a tapered vertical socket 120 as seen in FIG. 5. The wire-connection portion 132 of each spring rests in its respective indentation 62 in the rear wall 60 of the base section 40B with the spring contact ends resting in the base cavity.

The plastic insert 82 is then moved to the position shown in FIG. 1 above the spring connection area of the lower base section 40B and pillars 84 are fitted within the side slots 80 of the housing base section 40B. The insert 82 is then lowered in place. The insert 82 is depressed onto the springs and tends to force the bifurcated tips 142 into their respective vertical sockets 120 to pierce the insulation on the conductors wires 76 and conductively connect the springs to the respective conductor wires. The insert 82 is forced downwardly until pierced section 146 also pierces the insulation and adds a secondary or back-up and strain relief connection between spring and wire.

The next step in the assembly is the installation of the compression spring and camshaft to the assembly. The compression spring 30 is fitted in the blind opening 12 of the base section 40B. The transverse ends of the camshaft 22 are placed into the housing bearing openings 47. The cams of the camshaft rest above the respective spring body sections 134.

The upper set of leaf springs 70 are then placed on the insert 82. The cam engaging portions 134 rest on the cams with the bifurcated tips 142 of the springs pointing upwardly. The knee sections 140 rest in the rear recesses 86 of the insert with the bodies of the springs resting on the insert 82 and extending into the cavity to rest on the cams. The upper conductor wires are positioned in the upper housing cutouts of the upper base section 40A and the upper base section is lowered onto the insert pillars 84 and onto the leaf springs resting on the insert 82. The pressure exerted by the upper base section 40A as it descends acts to seat the wires into the bifurcated tips 142 to pierce the wire insulation and connect each wire to a leaf spring. The base sections 40A and 40B may thereafter be suitably adhered together by adhesive or heat or the like.

As viewed in FIG. 1, cams A and C maintain two spring contacts in the closed position shown in FIG. 8 and two cams B and D hold their contacts in the open position. Each cam may be set on the camshaft in a desired angular orientation to provide sequencing of the spring operations.

In the embodiment of FIG. 10, the camshaft alone is mounted in the housing prior to assembly of the springs, connection of springs to the conductor wires and closure of the housing. Thereafter, the transverse end cam throws 240 and stub shafts 230 are aligned with the slots of the lever arms and the housing is slid onto the actuator lever. when the stub shafts 230 rest within the end circular openings 220 of the slot and the eccentric cam throws 240 are mated fully with the inner slot 226, the actuator and switch mechanism are fully mated.

With the construction shown for both embodiments, a fully enclosed housing is provided. The two housing base sections are joined together to cooperatively enclose the cavity on all sides. The bearing openings 47 on the lateral sides 45 of the housing are covered by the two step camshaft bearing surfaces. At the rear the slots 62 and indentations 72 are filled by wires, leaf spring terminal ends and by the insert 82 (See FIG. 8). Thus, the entrance openings to the spring bearing cavity are occupied and complete the dust-tight housing.

As the mechanism would be used, the housing could be held stationarily within a mounting with the camshaft essentially horizontal and the front end of the housing elevated. The actuating lever is pivotally supported on the camshaft in the embodiment of FIGS. 1-9. The actuating arms 14 are depressed by the action of a plunger cradle switch or handset itself, overcoming the bias imposed by spring 30. As the actuating lever pivots, the camshaft rotates within the housing journal openings.

As the camshaft rotates, the cams make or break the contacts of the spring pairs. Thus, in FIG. 1, cams A and C would open their contact sets while cams B and D would allow their contact sets to close. The sequence of operation of contacts sets would be determined by the angular orientation of the cams relative to a base plane through the camshaft axis. On release of the actuating force on the actuating lever, the bias of spring 30 restores the lever to its original condition, restoring the contact springs to their original condition.

In the embodiment of FIG. 10, pivotal movement or rotation of the actuating lever is about the axis of stub shaft 230 and rotates the camshaft 234. The camshaft 234 further rotates relative to the actuating lever due to the eccentric end cam throws 240 to move the camshaft 234 through the added arc causing enhanced wiping action on the contacts and allowing greater contact pressures to be generated.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An electrical hookswitch mechanism, for use in a telephone instrument for actuating a plurality of contact spring sets on each operation of the mechanism, comprising: an actuating lever for said mechanism, a plurality of sets of leaf springs, each spring comprising an elongated body portion with a contact at one end thereof stepped from the body portion, each set of springs including a spring in a first parallel alignment and a spring in a second parallel alignment, a rotatable camshaft positioned between the first and second alignments, a plurality of cams on said camshaft with each cam positioned between springs of a set along the body portion thereof, first and second oppositely directed lobes on each cam, each said lobe having a spring engaging surface adapted to engage a respective one of the springs of the set between which the cam is positioned, an enclosing housing surrounding said springs and cams, with lateral extensions of said camshaft extending out of said housing at each end to enable coupling of the camshaft to said actuating lever for causing rotation of said camshaft and consequent actuation of spring contacts in response to movement of said actuating lever, and shaft means for pivoting said lever spaced from and generally parallel to the axis of the camshaft and coupled thereto for rotation of said camshaft responsive to pivotal movement of the lever.

2. A hookswitch mechanism as claimed in claim 1, in which the pivot shaft means for said actuating lever comprises stub shafts extending from the lateral sides of the housing spaced from the camshaft to impart a lever arm distance between the pivot axis of the lever and the rotational axis of the camshaft.

3. A hookswitch mechanism as claimed in claim 2, in which said housing comprises two identical shell members joined with one of the shell members inverted relative to the other shell member to form a central cavity in the housing enclosing said cams, said camshaft and said leaf springs, and in which said stub shafts are comprised of integral portions of said housing.

4. A switch mechanism for use in a telephone instrument for actuating a plurality of contacts, comprising an actuating means, a plurality of sets of leaf springs in a side by side relationship, each leaf spring bearing a contact in alignment with a contact of another leaf spring in said set to enable direct make and break contact between leaf springs of a set of said plurality of sets of leaf springs, a camshaft bearing a plurality of cams with one cam for each set of springs, means for journaling said camshaft for pivotal movement, an enclosing housing for said leaf spring sets and said camshaft, aligned openings in transverse walls of the housing to provide said journaling means to enable ends of said camshaft to extend transversely from said housing, said housing comprising a box-like structure, said actuating means engages the ends of the camshaft for causing pivotal movement of said camshaft, said actuating means is supported on the box-like structure of said housing to generate cooperative engagement between said camshaft and said actuating means and said box-like structure comprises identical shell members joined to enclose said plurality of sets of leaf springs, said plurality of cams and said camshaft in a dust-tight enclosure, with ends of said camshaft protruding from said aligned journaling openings for pivoting said camshaft responsive to movement of said actuating means.

5. A switch mechanism as claimed in claim 4, in which said actuating means comprises a unitary actuating lever engaging said camshaft at the ends thereof to pivot said camshaft, the axis of said lever being the pivot axis of said camshaft.

6. A switch mechanism as claimed in claim 4, in which said actuating means comprises a unitary lever member engaging said camshaft at the ends thereof to pivot said camshaft, and in which said box-like structure includes coaxial pivot shafts extending from the opposite transverse sides thereof with a portion of each shaft extending from each of said shell members to combinedly form each shaft, and in which said shafts combinedly act as the pivot axis of the lever member.

7. A switch mechanism as claimed in claim 6, in which said lever member includes paired recesses for snap-on mounting to said pivotal shafts to hold the housing shell members together.

8. A switch mechanism as claimed in claim 6, in which said lever member includes a first slot for receiving one of said pivotal shafts and in which said lever member comprises a second slot aligned with said first slot for receiving an end of said camshaft.

9. A switch mechanism as claimed in claim 4, in which said camshaft includes an eccentric throw at an end thereof for engaging said actuating means thereby enhancing rotative movement of said camshaft in response to movement of said actuating means.

* * * * *